March 10, 1959 F. R. C. BERNARD ET AL 2,877,291
COLOR TELEVISION TEST APPARATUS
Filed June 9, 1954 10 Sheets-Sheet 6

INVENTORS
FRANCOIS R.C. BERNARD,
JOHN W. WENTWORTH &
ARCH C. LUTHER, JR.
BY
ATTORNEY

March 10, 1959 F. R. C. BERNARD ET AL 2,877,291
COLOR TELEVISION TEST APPARATUS
Filed June 9, 1954 10 Sheets-Sheet 7
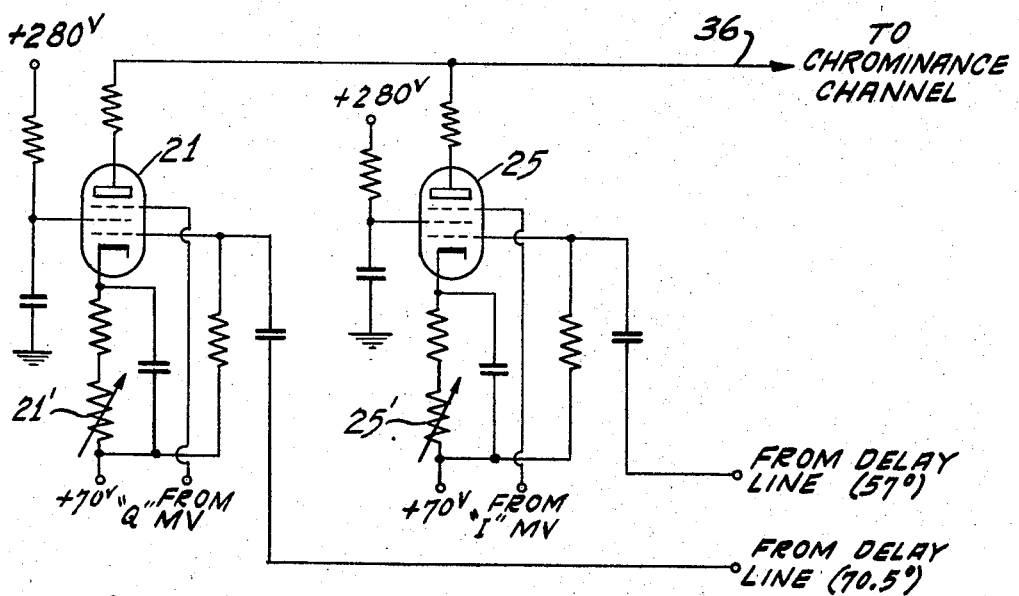
Fig_9
INVENTORS
FRANCOIS R.C. BERNARD,
JOHN W. WENTWORTH &
ARCH C. LUTHER, JR.
BY
ATTORNEY

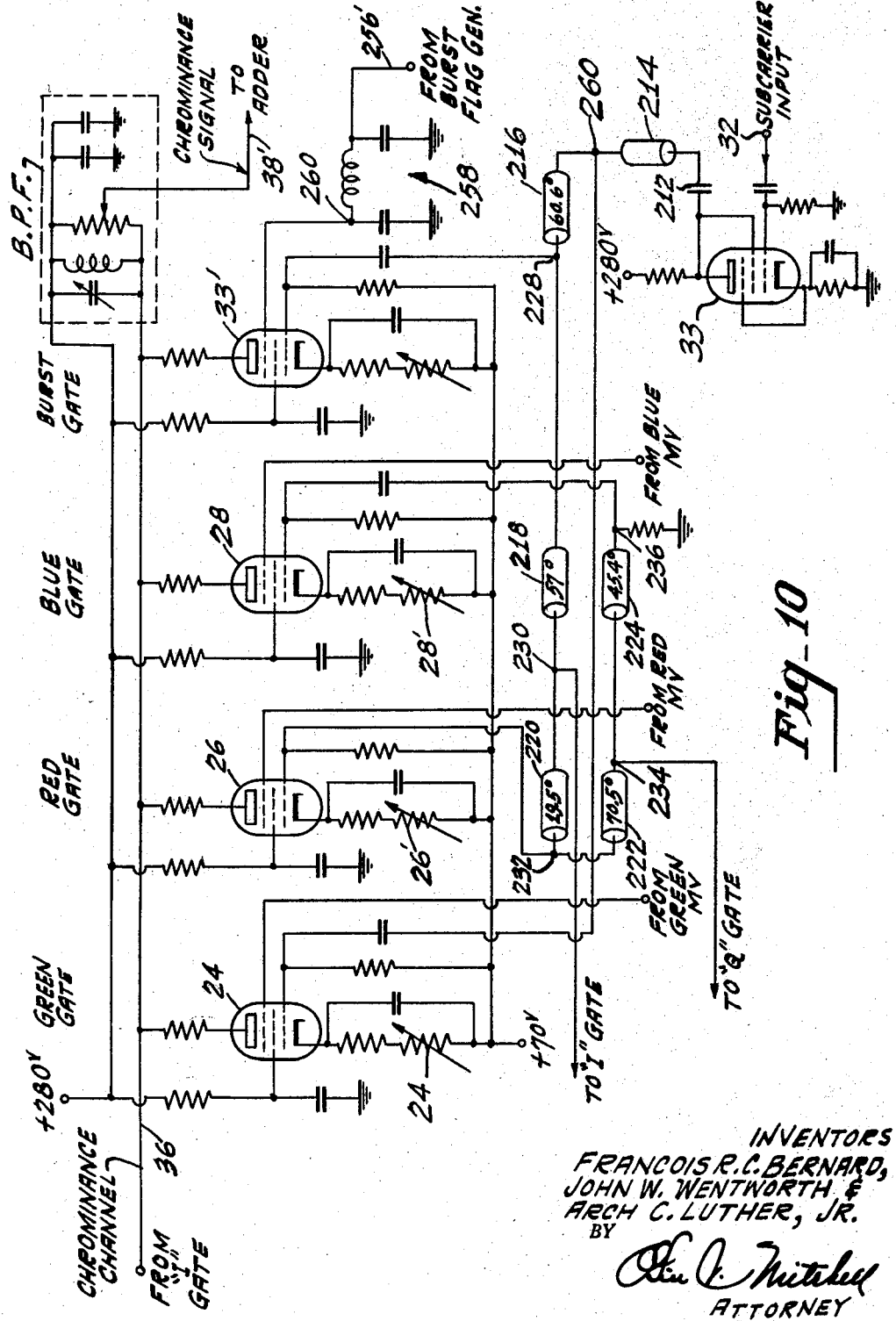

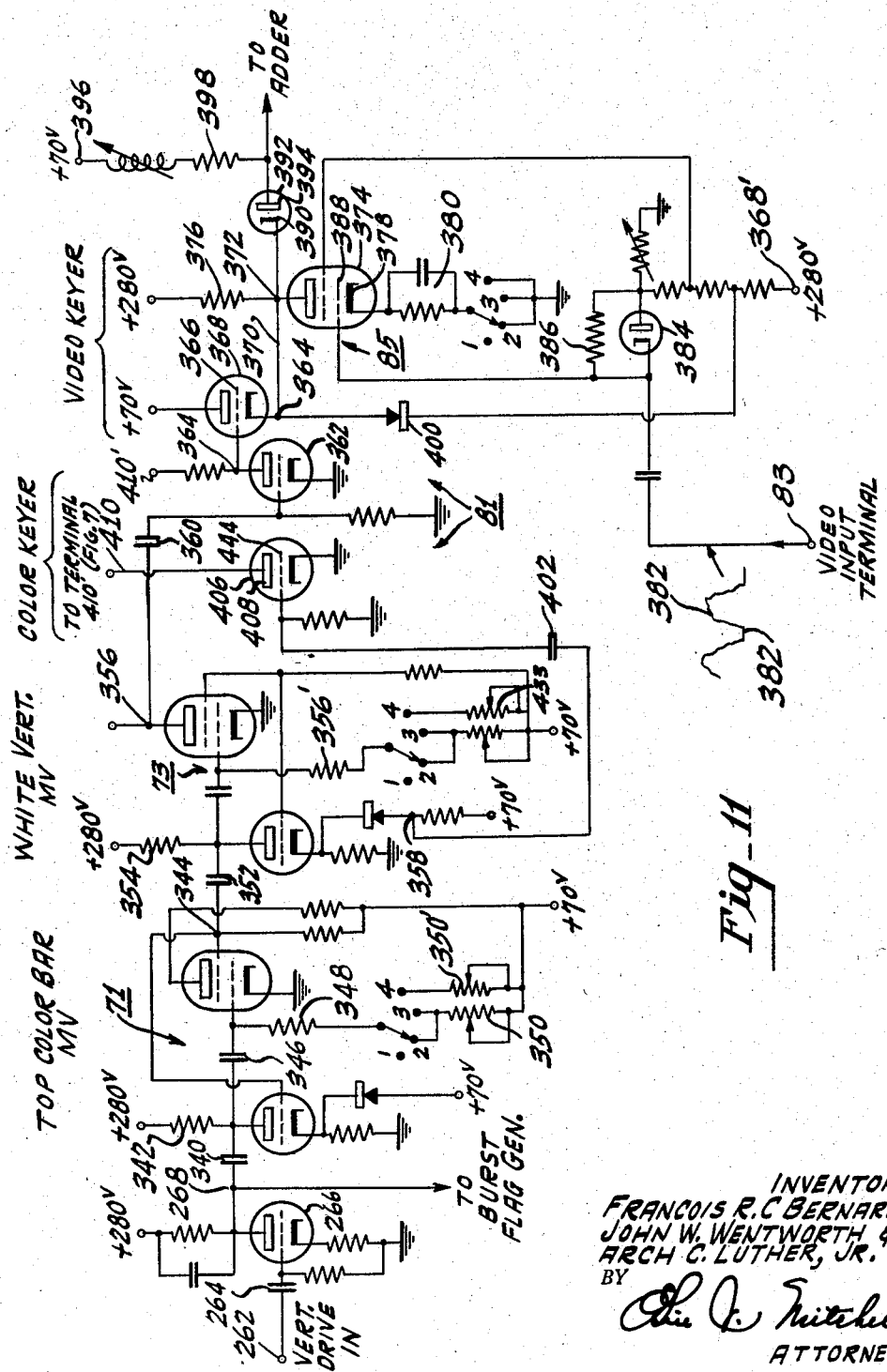

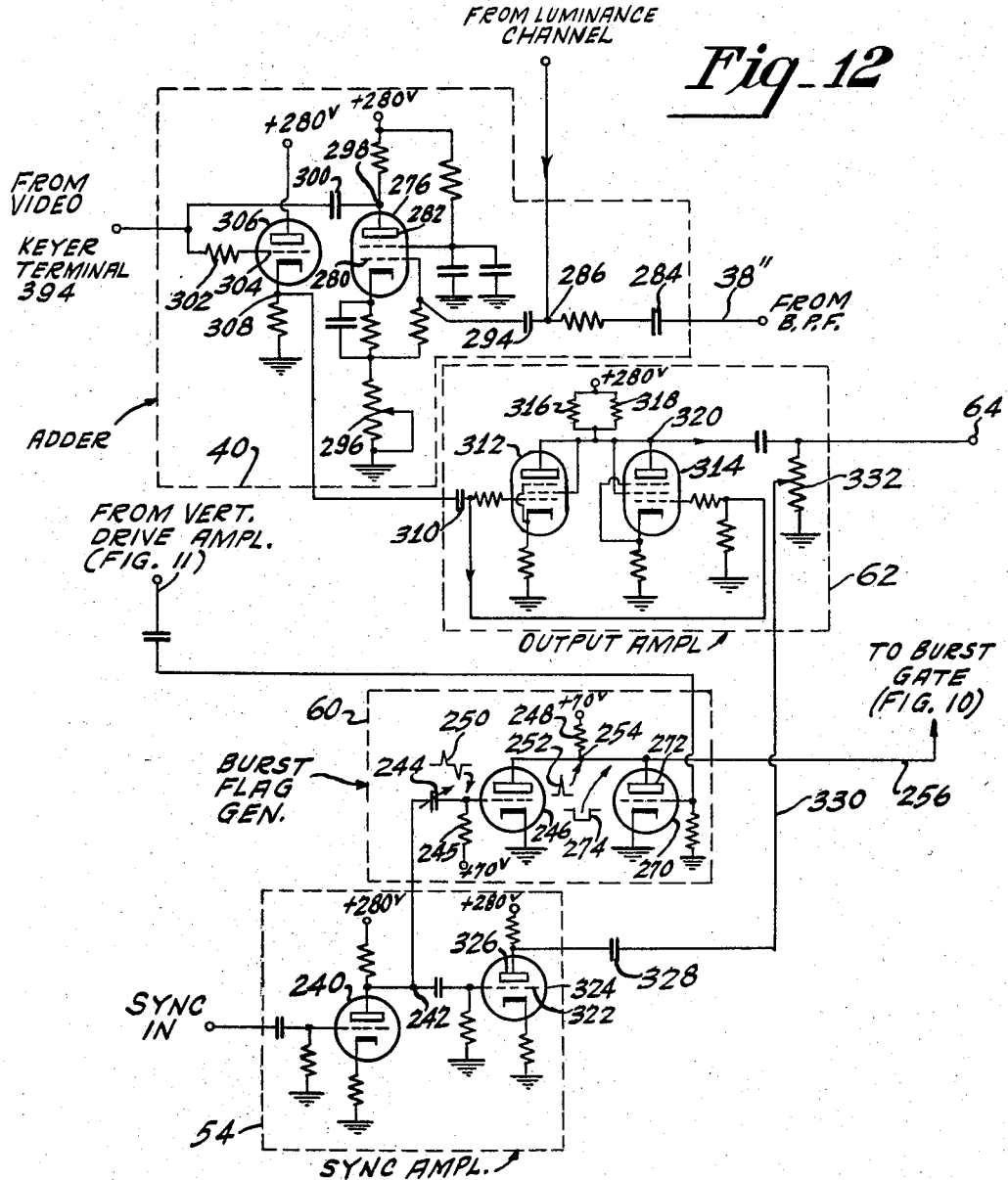

2,877,291

COLOR TELEVISION TEST APPARATUS

Francois R. C. Bernard, Collingswood, John W. Wentworth, Haddonfield, and Arch C. Luther, Jr., Merchantville, N. J., assignors to Radio Corporation of America, a corporation of Delaware Application June 9, 1954, Serial No. 435,462

The terminal fifteen years of the term of the patent to be granted has been disclaimed 6 Claims. (Cl. 178—5.4)

This invention relates to test apparatus for color television receivers and, particularly, to apparatus for use in generating a signal for testing the phase alignment of the subcarrier modulator circuits and the gain adjustment of the matrixing circuits employed in receivers and monitors for converting the received color signals to a form suitable for image-reproducing purposes.

By way of background information it is to be noted that, in accordance with the present color television standards as promulgated by the Federal Communications Commission, the signal which is transmitted consists of a luminance signal and one or more so-called color difference signals. The luminance signal is made up of predetermined proportions of the signals representing a plurality of colors, such as three selected component colors of a subject. The color difference signals are of a character such that, when each is combined with the luminance signal, there is produced a signal reprsentative of one of the selected component subject colors and which may be employed in this form for image-reproducing purposes.

The color difference signals are transmitted on a subcarrier wave having a frequency which is at the relatively high end of the frequency band including the luminance signal. The subcarrier wave has a frequency which is a large odd multiple of one-half of the horizontal or line scanning frequency. In this manner, the energy concentrations in the side bands of the color subcarrier wave are interleaved with the discrete energy concentrations of the luminance signal. In view of the fact that all three of the colors are represented in the luminance signal, it is necessary to transmit only two color difference signals. In this case, at a receiver, the third color difference signal may be derived in a suitable manner by proper combination of the two transmitted color difference signals and the luminance signal.

In transmitting the color difference signals, it is the practice to modulate them respectively on two quadrature phases of the subcarrier wave. Within the frequency range in which both side bands of the color subcarrier wave are transmitted, there is no distortion of the color difference signals. However, since the color subcarrier wave has a frequency which is in the upper region of the pass band of the communication channel, some of the higher color difference modulating signals are transmitted in only one of the color subcarrier wave side bands. In this single side band region, therefore, it is the practice to transmit only a single color difference signal in order to avoid signal distortion.

At a receiver the color difference signals for proper combination with the luminance signal must be derived from the subcarrier wave modulating signals. For this purpose, a converter is required. Such a converter has been called, because of its character, a matrixing circuit. In the present usage, it will be understood that a matrixing circuit is electronic apparatus for additively and/or subtractively combining signal voltages to change them from one form to another.

By reason of the fact that the "I" and "Q" signals are not present in an identifiable form in a picture signal, since such a signal is a continuously varying vector sum of the "I" and "Q" components, it is impracticable to attempt to test the phase alignment of a receiver through the use of a transmitted broadcast signal. Hence, it is a primary object of the present invention to provide means for synthetically producing subcarrier frequency signals of selected phase and amplitude, whereby the phasing of the demodulators and matrix circuits in a color television receiver or monitor may be checked in a simple, yet quite accurate manner.

In an article by Gloystein et al., "The Colorplexer—A Device for Multiplexing Color Television Signals in Accordance with the NTSC Signal Specifications" (Proceedings of the IRE, January 1954), there is described an effective arrangement, including a color bar generator and a colorplexer, for producing a test signal suitable for use with color receivers of the type in question. As stated in the article, the colorplexer requires delicately balanced modulators, precise filters, phase-splitters and highly linear amplifiers for producing the desired signal. The copending U. S. application of F. R. C. Bernard and J. W. Wentworth, filed June 9, 1954, Serial Number 435,591, provides simplified apparatus for synthesizing the results of a "Colorplexer" in producing a test signal comprising a plurality of subcarrier wave phases, each representative of a selected color and including a synthetic luminance component. In accordance with the Bernard and Wentworth invention, apparatus is provided for producing a plurality of bursts of color subcarrier wave frequency, each of said bursts having a different phase and being representative of a selected color. According to a specific embodiment of their invention as described therein, the bursts are representative of the three primary colors, red, green and blue, and the complementary colors yellow, cyan and magenta. The bursts whose phases represent the complementary colors are produced from signals representative of the primary colors, through the agency of means for selectively combining the primary colors with such amplitude phase as to produce, as a vector resultant, the proper phase and amplitude of the complementary colors. In that manner, the expensive and precisely balanced equipment of a colorplexer is replaced by simplified gates which need not be linear but which serve, when supplied simultaneously with subcarrier wave energy and keying pulses, to produce the color representative bursts. That is to say, by reason of the fact that the burst-producing gates operate primarily as "on-off" devices, linear transfer characteristics are rendered unimportant for production of the color test signals. In addition to the foregoing, means are provided for deriving from the keying pulses which actuate the gates a luminance or monochrome component of proper amplitude for the test signal. Since, as is understood, proper operation of color television receivers of the present type requires synchronization of a color reference oscillator at intervals normally corresponding to the television line rate, the cited signal generator includes means for producing such color oscillator synchronizing information.

The present invention provides a novel arrangement for permitting transmission of color television test signals in a manner which does not interfere with the simultaneous transmission of program material or monochrome test patterns, for example. As will be appreciated, it is desirable to provide transmitted color television test signals of the type described above as provided by the Bernard and Wentworth apparatus during all or most of each day, in order that service personnel in the field may align color television receivers and transmitters. Such continual transmission of a color bar pattern, however would be objectionable for the obvious reason that it would prevent the normal transmission of program material and test patterns. Hence, the present invention provides means for transmitting color television test signals which appear upon the image-reproducing tube of a color television receiver in the marginal region of its raster. That is to say, the apparatus of the present invention may be employed for mixing color television test signals of the type in question with television image signals derived from any form of program material in such manner that the test color bars appear only in the borders of the raster of the image-reproducing kinescopes in receivers.

Hence it is a principal object of the present invention to provide novel color border generating apparatus for transmitting color test bar patterns and the like adapted to appear only in the border areas of the raster scanned by a receiver kinescope.

In general, the present invention accomplishes its aims through the provision of means synchronized with the television transmitter operation for gating color representative subcarrier bursts into a video signal transmission channel during selected portions of the television field time. A specific embodiment of the invention includes a multiple-position selector switch adapted to vary the operation of the apparatus in such manner that, in one position of the switch, the color test bars appear for the full vertical raster height; in another position of the switch, the color bars representing the primary and complementary colors appear only at the top and bottom of the scanned raster, while "I" and "Q" bars are arranged vertically along the sides of the scanned raster. In still another position of the switch, the circuit arrangement produces color bar patterns in which not only the color representative bars themselves but also the "I" and "Q" bars appear only at the top and bottom borders of the raster. In a last position of the switch, the vertical dimension of the color bars is substantially decreased, whereby to provide even more useful area for broadcast image reproduction.

Additional objects and advantages of the present invention will become apparent to persons skilled in the art from a study of the following detailed description of the accompanying drawing in which:

Figs. 7 through 12 illustrate, by way of schematic circuit diagram, a complete operative embodiment of the invention.

In order that the utility of the instant invention may be more fully understood, there follows a somewhat detailed description of the color signal specifications set by the Federal Communications Commission and with which the apparatus of the present invention may be advantageously employed.

Figure 1:
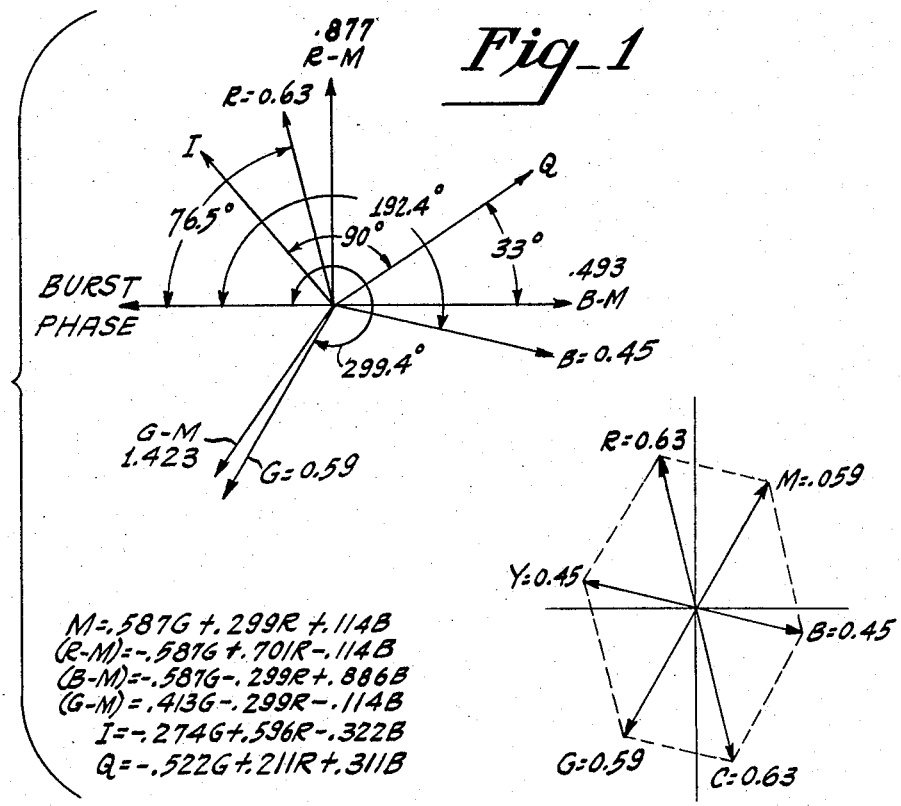
Fig. 1 is a vector diagram together with certain equations representing the relationship of color signals, color difference signals and color subcarrier wave modulating signals in a system with which the invention may be used.

Reference first will be made to Fig. 1 of the drawings for a general description of the color television signalling system. This figure includes a vector diagram in which the red, blue and green color signals are represented by the vectors R, B and G and in which the respective red, blue and green color difference signals are represented by the vectors (R–M), (B–M) and (G–M). It will be understood that this vector diagram represents only the angular relationship between the various signals referred to. The illustrated lengths of the vectors is insignificant, since these lengths change with the different color content of the subject represented by the signals. Also, it will be understood that, with respect to the color difference signals (R–M), (B–M) and (G–M), the representative vectors indicate the angular relationship between such signals, if, in fact, the color subcarrier wave were modulated directly by the color difference signals. In the standard system, however, the color subcarrier wave is not directly modulated by these color difference signals, so that the various representative color difference signals are shown merely for reference purposes. In this connection, it is noted that the burst signal vector is 180° out of phase with the blue color difference signal (B–M). The burst signal is employed in a manner now well-known to effect synchronous operation of the color signalling apparatus at the transmitter and receiver.

It also may be noted from the vector diagram of Fig. 1 that the red color difference signal (R–M) leads in phase the blue color difference signal (B–M) by 90°. Accordingly, the burst signal leads the red color difference signal (R–M) by 90°. Furthermore, in accordance with the presently proposed NTSC standards, the system operates by the modulation of the color subcarrier wave directly by two signals designated respectively as the "I" and "Q" signals. From the vector diagram, it may be seen that the "I" signal leads the "Q" signal in phase by 90°. Also, the "I" and "Q" signals lead in phase, respectively, the red color difference signal (R–M) and the blue color difference signal (B–M) by 33°.

In the remaining portion of Fig. 1, the different amplitude relationships between the various vectors representing signals shown in this figure are given by the equations in which the quantities referred to are signal voltages. In order to present the relationships between the various signal voltages as clearly as possible, it will be understood that the various letters and quantities represented by letters grouped together in brackets or parentheses represent the signal voltages indicated by the different letters referring to the different color and the luminance signals. As indicated in Equation 1, the luminance signal "M" is made up of the algebraic sum of the specified quantities of the green, red and blue signals, G, R and B, respectively, representing light of these colors derived from the subject. Also, in Equations 2, 3 and 4 the various color difference signals (R–M), (B–M) and (G–M) are given in terms of the color signals representing the subject. The "I" and "Q" subcarrier wave modulating signals are given in Equations 5 and 6, respectively, in terms of the different color signals representing the subject.

Figure 2:
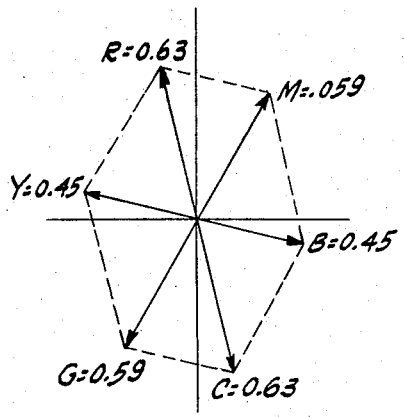
Fig. 2 is a vector diagram to be referred to infra.

From the foregoing description of a color television signal system, it should be apparent that, although only the primary colors have been indicated in the vector diagram of Fig. 1, the complementary colors may also be represented vectorially as the resultants of certain selected primary colors. Thus, for example, Fig. 2 illustrates the manner in which the complementary colors yellow, cyan and magenta may be derived from the primary colors. That is, the vector representing yellow is seen to be the resultant of the vector addition of the red and green vectors. Similarly, the color cyan is the resultant of the green and blue vectors, while the magenta vector is derived from the red and blue vectors. As will appear more fully hereinafter, it is necessary for the gate circuits of the present invention which produce the several bursts of different phase to have specific gain characteristics in order to afford the proper amplitudes for the primary colors, so that addition of the primary colors can produce the proper complementary color phases.

Figure 3:
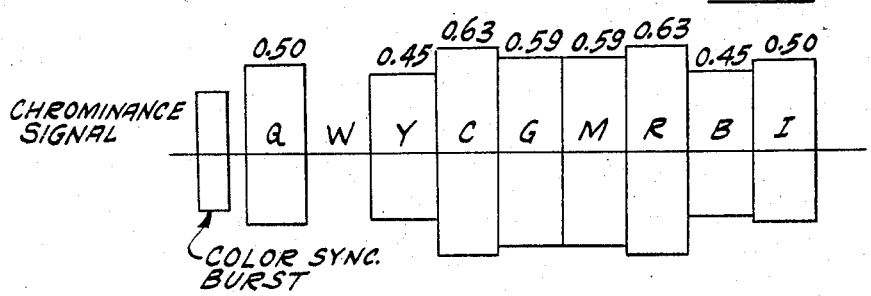
Fig. 3 illustrates a series of bursts representative of one aspect of the present invention.

Fig. 3 illustrates a wave form which may be produced, for example, with a colorplexer of the type described in the above-cited Gloystein article. Specifically, the wave form includes a plurality of bursts of subcarrier wave frequency (e. g. 3.58 megacycles). Each of the bursts in Fig. 3 corresponds to that vector in Fig. 2 bearing the same designation and will be understood, therefore, as being of the phase shown in Fig. 2 with respect to the arrow labelled "burst reference phase." As has been stated, the type of apparatus normally employed at color television transmitter stations such, for example, as the colorplexer, requires elaborate modulating, mixing and filtering circuits which are not necessary for the production of a test signal (as opposed to broadcast program material). One form of the present invention, illustrated diagrammatically in Fig. 4, includes means according to the cited Bernard and Wentworth application with additional circuitry for producing a color television test signal such as that shown in Fig. 5 by the wave form (a). That is to say, in wave form (a) of Fig. 5 there is shown the signal produced for a single television line interval between the horizontal synchronizing pulses S. Each of the synchronizing pulses S is superimposed on a conventional RTMA blanking pedestal 10 and is followed by a color reference synchronizing burst 12 as specified in the FCC signal standards. A description of the function of the color synchronizing burst 12 may be found, for example, in a publication entitled "Recent Developments in Color Synchronization in the RCA Color Television System," published by the Radio Corporation of America, February 1950. Briefly, it may be noted that the burst 12 of subcarrier wave frequency provides a reference for the subcarrier wave oscillator and color sampling demodulators at the receiver. The blanking pedestal 10 is followed by a "Q" burst which is, in turn, followed by a white band "W" whose amplitude is selected as unity and which contains no subcarrier wave energy, since white, as is known comprises the resultant of red, green and blue colors. The white band "W" is followed by color subcarrier bursts such as those shown in Fig. 3 at "Y," "C," "G," "M," "R," "B" and "I." Each of the bursts enumerated is provided with a direct current axis indicated by the dotted lines, each axis being of the specified amplitude and being indicative of the luminance or monochrome component of the test signal. While the apparatus of the present invention, as will be described, provides the test signal with the color bursts in the order shown (i. e. in decreasing order of luminance) and with "Q" and "I" bursts at the beginning and end of the line, it should be understood that any other sequences may be followed.

Figure 4:
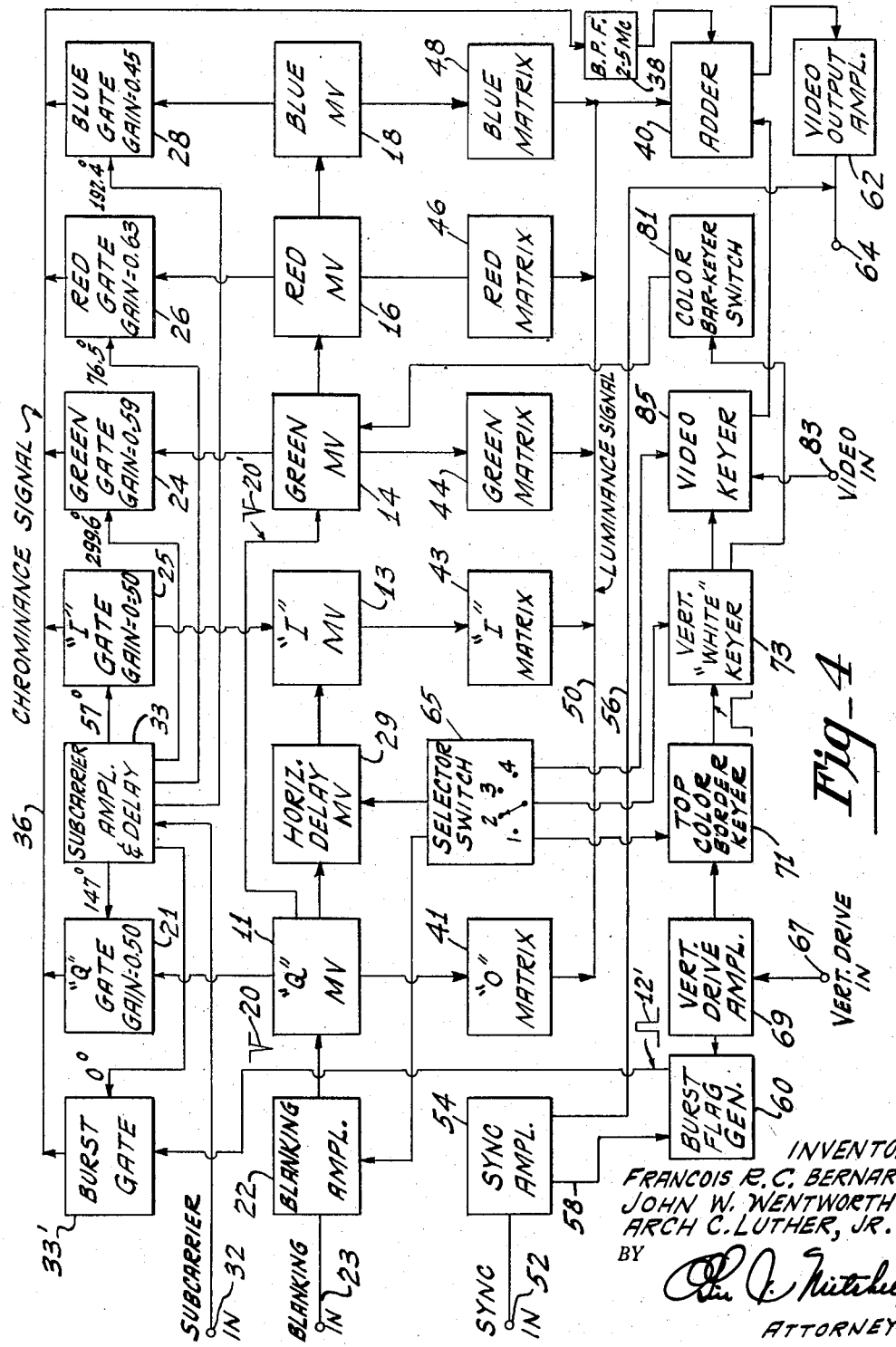
Fig. 4 illustrates, by way of block diagram, an embodiment of the invention.

In the block diagram of Fig. 4, the color burst producing circuits from which are derived the keying pulses for the color bursts are indicated by the blocks 11, 13, 14, 16 and 18 which are labelled as "Q," "I," "Green," "Red" and "Blue" multivibrators. The multivibrators are triggered by pulses or spikes 20 derived in a blanking pulse amplifier stage 22 which is supplied with conventional RTMA blanking pulses at terminal 23. Each of the multivibrators has an output connected to a corresponding gate circuit shown by the blocks 21, 25, 24, 26 and 28 for applying burst gating or keying pulses to the gate circuits. The manner of operation of the multivibrators 11, 13, 14, 16 and 18 is depicted by the wave forms (b) through (h) of Fig. 5.

Figure 5:
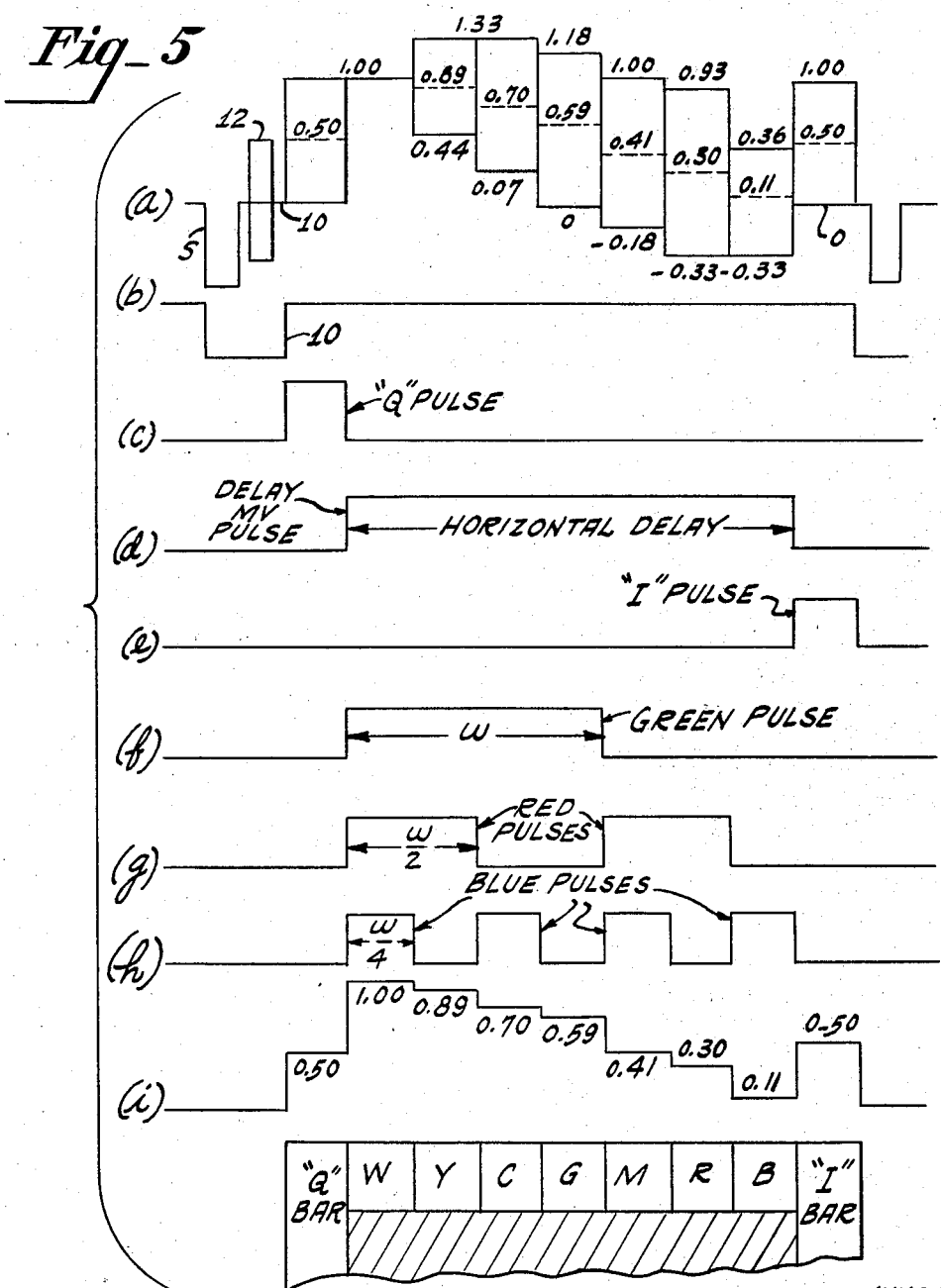
Fig. 5 illustrates a test signal which may be derived from the apparatus of the invention together with certain wave forms employed in producing the test signal.

The horizontal blanking pulses 10 are reproduced separately in wave form (b) of Fig. 5 to clarify the time relationships to be described. The above-mentioned spike 20 derived from the trailing edge of the blanking pulse 10 is cause to trigger the "Q" multivibrator 11 whereby to cause the latter to produce a "Q" burst gating pulse shown in wave form (c) of Fig. 5. The output pulse of the multivibrator 11 is also applied to a horizontal delay multivibrator 29 which produces the output pulse shown in wave form (d). The leading edge of the output pulse of the multivibrator 29 is substantially coincident with the trailing edge of the "Q" pulse of wave form (c). The duration of the delay multivibrator pulse is chosen so that the trailing edge of that pulse occurs a predetermined time before the end of the television line, so that that trailing edge properly triggers the "I" multivibrator 13 which, in turn, produces the "I" burst gating pulse of wave form (e).

The wave form (f) of Fig. 5 illustrates the output pulse of the green multivibrator 14 as having a duration "w." The green multivibrator also is triggered by the pulse 20' which corresponds in time to the trailing edge of the "Q" bar pulse 10. The red multivibrator produces pulses (wave form (g) of Fig. 5) of duration $$\frac{w}{2}$$

and is triggered by both the leading and trailing edges of the green multivibrator output pulses. The blue multivibrator 18 produces the output pulses shown in wave form (h) of Fig. 5 having duration $$\frac{w}{4}$$

and is triggered by both the leading and trailing edges of the pulses from the red multivibrator 16. As may be seen from the wave forms (a) through (h) of Fig. 5, all of which are drawn to the same time scale, addition of the wave forms (f), (g) and (h) will produce, in the order shown, the several primary and complementary colors of wave form (a). The multivibrators and their mode of operation as described thus far do not constitute a part of the present invention but are rather described and claimed in the copending application of A. C. Luther, Jr., Serial No. 383,284, filed September 20, 1953, for "Color Bar Signal Generator."

With the pulses shown in wave forms (c), (e), (f), (g) and (h) of Fig. 5 applied respectively to the gates 21, 25, 24, 26 and 28 of Fig. 4, the gates are in condition for producing the bursts representative of the primary and complementary colors. The manner in which such burst production is accomplished will now be described. A source of subcarrier wave energy of, for example, 3.58 megacycles, is connected to terminal 32 for applying a subcarrier wave of that frequency to an amplifier and delay arrangement 33 which supplies subcarrier wave energy of the phases shown to the burst gate 33' and to the "Q," "I," green, red and blue gates 21, 25, 24, 26 and 28 respectively. Each of the gates 21, 25, 24, 26 and 28 is therefore, continuously supplied with a wave of subcarrier frequency energy and of a specific phase with respect to the phase of the wave applied to the burst gate 33'. Hence, upon receiving a pulse from its associated multivibrator 11, 13, 14, 16 or 18, each of the gates 21, 25, 24, 26 and 28 will pass a burst of subcarrier frequency and of its assigned phase into a common output channel 36 which is labelled "chrominance signal." Combined output signals from the gates 21, 25, 24, 26 and 28 are, in turn, passed through a band pass filter 38, whose center frequency is substantially that of the subcarrier frequency bursts, to an adder circuit 40.

Further in connection with the production of the bursts representative of primary and complementary colors, and as pointed out in the description of Figs. 2 and 3, it is necessary that the amplitudes of the green, red and blue bursts be of specified values in order for the yellow, cyan and magenta bursts to be properly produced by vector addition. These amplitudes are shown in Figs. 2 and 3 as "G"=0.59, "R"=0.63 and "B"=0.45. In accordance with these required amplitudes, therefore, the green, red and blue gates are indicated as having relative gains of those amounts. The "Q" and "I" gates are arbitrarily provided gains of 0.50.

From the foregoing, it should be understood that by reason of the time relationships of the pulses produced by the several multivibrators, the composite outputs of the green, red and blue gates will be as shown in Fig. 3, wherein there is illustrated the fact that the first color interval "W" after the "Q" burst, namely that corresponding to white, contains no subcarrier frequency energy, by reason of the fact that the red, green and blue bursts cancel other other. The complete test signal shown in wave form (a) of Fig. 5, however, additionally includes a luminance or monochrome component for each of the subcarrier bursts, which components are produced by the matrix circuits 41, 43, 44, 46 and 48 which are connected to the green, red and blue multivibrators 11, 13, 14, 16 and 18, respectively, and in such manner as to receive pulses from those multivibrators corresponding to those shown in wave forms (c), (e), (f), (g) and (h) of Fig. 5. The matrix circuits constitute means for deriving selected proportions of the several color bar pulses with the respective values of 0.50, 0.50, 0.59, 0.30 and 0.11. These values will be recognized by those skilled in the art as being the luminance constants selected from the "constant luminance" type of system to give a certain luminance to each of the bursts. The outputs of the matrix circuits 41, 43, 44, 46 and 48 are connected to a common channel 50 designated "luminance signal" which, in turn, is connected to a second input terminal of the adder circuit 40. The luminance signal is illustrated, per se, by waveform (i) of Fig. 5. The adder circuit combines the chrominance signal (Fig. 3) and the luminance signal in a conventional manner.

Finally, with regard to the overall operation of the block diagram of Fig. 4 insofar as the production of a complete television line interval is concerned, it will be noted that the composite signal to be produced must further include scanning synchronizing pulses S and color synchronizing bursts 12. These are combined with the chrominance and luminance signals as follows: television synchronizing signals S of the usual form are supplied from a source (not shown) to the input terminal 52 of a synchronizing pulse amplifier 54 which has two output terminals 56 and 58. The terminal 56 receives amplified versions of the horizontal and vertical synchronizing pulses of the television system. The second output terminal 58 of the sync amplifier 54 applies horizontal sync pulses to a burst flag generator 60 whose function is that of applying keying pulses 12' to the burst gate circuit 33'. The keying pulses 12' are derived from the horizontal sync pulses "S" and delayed approximately 0.6 microsecond in such manner as to follow them closely in time whereby the gate 33' produces an output burst of subcarrier energy 12 located in time as shown by wave form (a) of Fig. 5. The amplified sync pulses from the above-mentioned terminal 56 are applied to the output stage 62. The output of the synchronizing burst gate 33' is fed into the chrominance signal channel 36 for combination with the "Q" and "I" and color-representative subcarrier bursts from the gates 21, 25, 24, 26 and 28. Thus it is noted that, at the output of the adder circuit 40, there is available a complete signal which, when amplified by the stage 62, provides at the terminal 64 the composite test signal wave form (a) of Fig. 5.

As thus far described, the apparatus shown diagrammatically in Fig. 4 is capable of producing, during a television line interval, a composite wave form such as that shown in Fig. 5(a). The arrangement for producing both primary and complementary color bars from the primary color multivibrators does not, per se, form a part of the present invention but is, rather, described and claimed in the copending U. S. Patent application of A. C. Luther, Jr., Serial No. 383,284, filed September 20, 1953, for "Color Bar Signal Generator." The specific apparatus of Fig. 4 for deriving the several primary color and complementary color representative bursts of subcarrier energy is in accordance with the above-cited Bernard and Wentworth application. In accordance with the present invention, means are provided, inter alia, for producing "Q" and "I" bursts and for limiting the transmission of the test signal of Fig. 5(a) to selected portions of each television field, whereby the color test signals may be transmitted in the same fields with television broadcast image information, so that both the color test pattern and the television image are reproduced on the same receiver kinescope, but in different portions of its raster.

Figure 6:
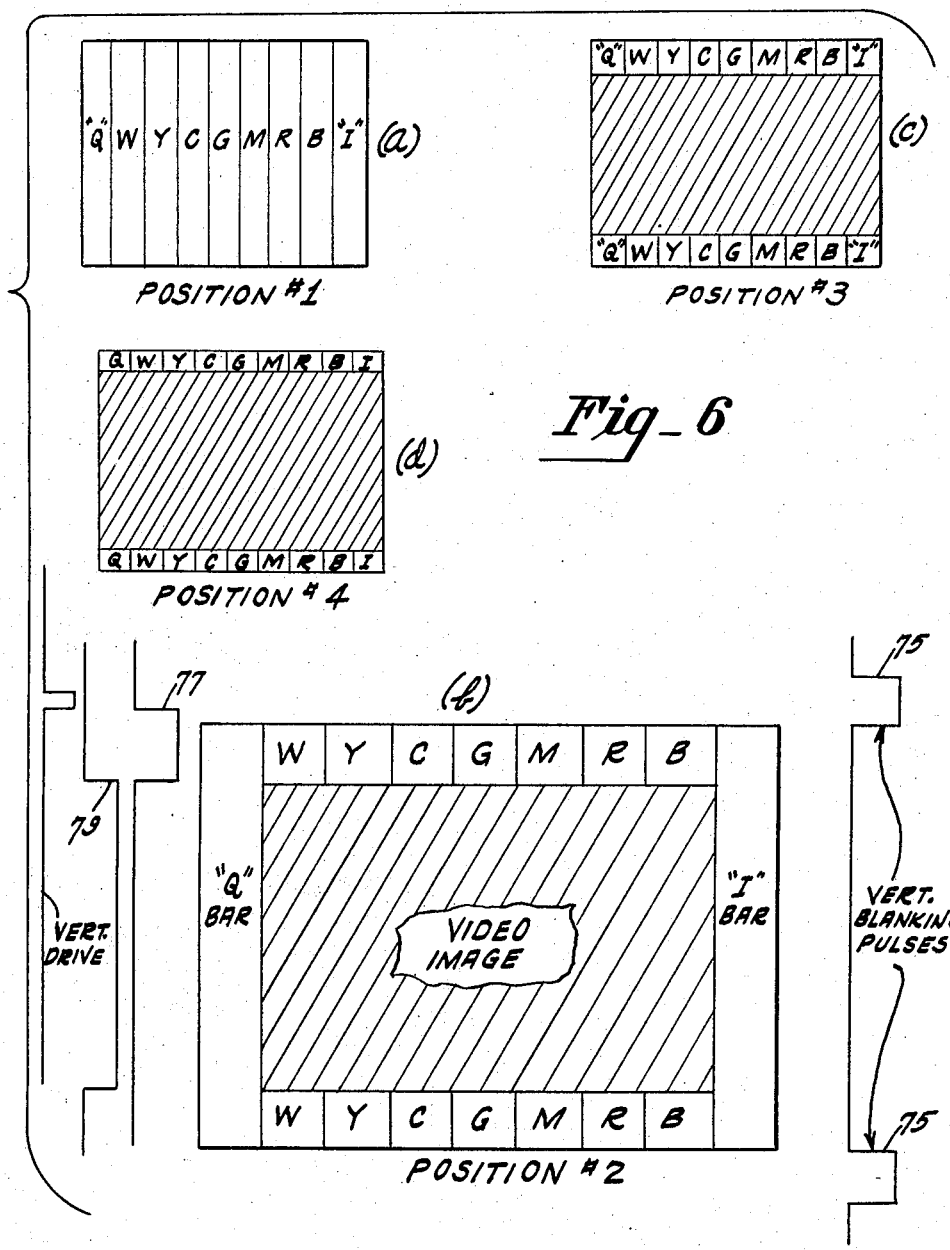
Fig. 6 illustrates several patterns which may be produced by the invention.

As has been stated supra, one specific form of the present invention includes a multiple-position selector switch for modifying the operation of the circuits in several different ways, whereby to change the appearance of the finally reproduced image. Fig. 6 illustrates the appearance of the raster produced on a receiver kinescope for the several positions of the switch. More specifically, Fig. 6(a) illustrates a raster comprising the plurality of vertical bars representative of the colors noted and having "Q" and "I" bars at its left and right extremities. Such a pattern comprises a well-known color bar pattern which may be produced through the use of the arrangement described in the above-cited Gloystein article and is particularly advantageous under circumstances in which it is not desired to transmit any broadcast signals for reproduction. A second type of pattern which may be produced in accordance with the invention is that shown in Fig. 6(b) wherein the color bars representative of white, yellow, cyan, green, magenta, red and blue appear only at the top and bottom of the raster as borders of predetermined vertical dimension, while the "Q" and "I" bars extend throughout the vertical dimension of the raster on its left and right extremities, respectively. The remaining portion of the raster shown in shaded lines may be devoted to the reproduction of any video image. With the pattern of Fig. 6(b), therefore, the color bar test information appears only around the borders of the raster, while the television image occupies the central portion thereof.

Fig. 6(c) illustrates a third pattern which may be produced, namely, one in which the "Q" and "I" bars are also limited to the top and bottom borders of the raster. That is to say, in the pattern of Fig. 6(c), the "Q" and "I" bars do not extend throughout the vertical dimension of the raster as in the pattern of Fig. 6(b). Thus it will be appreciated that the pattern of Fig. 6(c) permits the use of additional raster area for program material, as shown by the shaded area therein.

In still another pattern available with the present invention, the color test bars, including the "Q" and "I" bars, are again (as in Fig. 6(c)) limited to the top and bottom borders of the raster. In this last-mentioned pattern, however, and as illustrated in Fig. 6(d), the color borders are of even smaller vertical dimension than in Fig. 6(c), so that still more raster area may be devoted to the usual image reproduction.

The versatility of the present invention is afforded through apparatus included in the diagrammatic showing of Fig. 4 in which a selector switch 65 is shown. Since the switch is a multiple position arrangement, its operation will be better understood from the detailed description of the schematic diagrams of the circuitry provided in the remaining figures of the drawing for practicing the invention. In general, however, and assuming that the selector switch 65 is in its position No. 2 (corresponding to the pattern of Fig. 6(b)), the arrangement which obtains is as follows: vertical driving pulses occurring at the rate of 60 cycles per second in accordance with conventional television practice are applied to the input terminal 67 of a vertical drive amplifier 69 which amplifies the vertical driving pulses and applies them to a top color border keyer 71. The keyer 71 comprises a multivibrator adapted to be triggered into operation by the trailing edge of the vertical driving pulses for producing a pulse of predetermined duration corresponding to the vertical dimension of the top color bar border (Fig. 6(b)). The trailing edge of the pulse from the keyer 71 triggers another multivibrator 72 designated as a "vertical 'white' keyer" which, in turn, provides an output pulse whose duration is a proportion to the vertical dimension of the raster portion to be devoted to television video image reproduction. The operation of the keyers 71 and 73 may be better understood from the wave forms drawn vertically alongside the pattern of Fig. 6(b). The vertical blanking pulses 75 shown at the right of the pattern encompass the vertical dimension of the entire raster. The output pulse from the top color border keyer 71 is shown by wave form 77 and its leading edge (upper) occurs coincidentally with the trailing edge of the uppermost driving pulse. The trailing edge of the top color border keyer pulse 77 defines the lower limit of the upper color border shown in heavy lines. The pulse produced by the vertical white keyer 73 is shown at 79 and its leading edge is substantially coincident with the trailing edge of the pulse 77. The pulse 79 terminates at a time corresponding to the upper edge of the lower color border of the pattern. The pulses 79 from the keyer 73 are applied to a color bar keyer switch circuit 81 which, in turn, prevents the green multivibrator 14 from being actuated for the duration of the pulse 79. Since the color bars and bursts representing the green, red and blue colors and their complementary colors are produced through the action of the green, red and blue multivibrators 14, 16 and 18, those color bars are not produced during the time of pulse 79. The "Q" and "I" multivibrators 11 and 13, however, are not affected by the vertical white keying pulse 79, so that the "Q" and "I" bars continue to be reproduced throughout the vertical dimension of the raster.

Video signals representative of any desired form of television image, whether color or monochrome, are applied from a suitable source (not shown) to the video input terminal 83 of a video keyer circuit 85 which may, for present purposes, be viewed as a gating arrangement which normally is inoperative to pass the video signals. The pulses 79 from the keyer 73 are applied to the video keyer 85, however, in such manner as to render the video keyer 85 conductive for the video signals during that portion of the television field which is encompassed by the pulse 79. In order to prevent the video keyer 85 from passing video signals during the "Q" and "I" bar portions of the pattern, pulses corresponding in time to the "Q" and "I" multivibrator output pulses but derived from the delay multivibrator 29 are also applied to the video keyer 85 to prevent its conduction of video signals. From the foregoing, therefore, it will be understood that the video signal keyer 85 is effective in passing video signals corresponding to that portion of the raster shown in shaded lines in Fig. 6(b). The video signals passed by the keyer 85 are applied to the adder circuit 40 for combination with the test portions of the signal. The composite signal from the adder 40 is then applied to the video amplifier stage 62 for further amplification. The final signal at terminal 64 may then be applied to a suitable transmitter for modulation of a radio frequency carrier wave and ultimate transmission or may, alternatively, be applied directly to television apparatus capable of operating upon the signal. Thus, for example, the signal from terminal 64 may be applied directly to the input terminal of a monitor for checking its operation. Since each of the color representative bursts of the composite signal is in accord with the standard color television signal specifications, it will be understood that a monitor or receiver to which the composite signal is applied will reproduce an image corresponding to the pattern of Fig. 6(b), namely, with the vertical "Q" and "I" bars at the extremities of the raster and with the consecutive bands of white, yellow, cyan, green, magenta, red and blue at the top and bottom borders of the raster. The video image will, therefore, occupy that portion of the raster within the four borders of the test pattern. A rapid check of the operation of the monitor or receiver may be determined visually by observing the appearance of the color borders on the screen of the image reproducer. For more accurate tests, the wave forms at various points in the receiver demodulator and matrix circuits may be observed on an oscilloscope, as will be understood.

A complete operative circuit which may be employed for performing the functions indicated by the block diagram discussed thus far is illustrated schematically by Figs. 7 through 12, wherein reference numerals identical to those used in Fig. 4 represent corresponding elements. The RMTA blanking signals are impressed upon the blanking amplifier input terminal 23 and are applied via a capacitor 90 and crystal diode 92 to the control electrode of an amplifier tube 94. The capacitor 90 is charged by the incoming blanking signal and is discharged by the diode 92 through the resistor 96. The time constant of this circuit is such that no substantial discharge of the capacitor 90 occurs during the short interval of the horizontal blanking pulses, so that the horizontal blanking pulses are impressed upon the tube 94. Since television vertical blanking pulses are of much greater duration than the corresponding horizontal pulses, the capacitor 90 effectively discharges through the diode 92 such that no sharp trailing edge results at the tube 94. The output signal of the amplifier 94 is capacitively coupled to the cathode 98 of a triode 100 which, in turn, amplifies the horizontal blanking pulses. It is to be noted that the input to the triode 100 comprises a differentiating circuit made up of the capacitor 102 and resistor 104, whereby the signal actually applied to the cathode 98 is in the form of alternate positive and negative spikes. The spike corresponding to the trailing edge of the horizontal blanking pulse is, therefore, amplified by the tube 100 to produce a trigger spike 20 at the terminal 106. Terminal 106 is connected to the input terminal of a monostable multivibrator 11 constituting the "Q" multivibrator of Fig. 4. The specific circuitry of the multivibrator 11 does not constitute a part of the present invention but is described and claimed in essence in the copending U. S. application of A. C. Luther, Jr., Serial No. 343,623, filed March 20, 1953, entitled "Monostable Multivibrator." The multivibrator 14 comprises three electron tubes or unidirectionally conducting devices, namely, a triode 108, a tetrode 110 and a diode 112. The anode of the triode 84 is connected through the capacitor arrangement 90 to the control electrode of the tetrode 86 which is normally conducting. Thus it will be seen that the negative spike 20 will be coupled through the capacitor 114 to the control electrode of the tetrode 110 whereby to cut off conduction of that tube. The triode 108 is simultaneously rendered conductive for the duration of the pulse shown in wave form (c) of Fig. 5, the duration of the pulse being determined by the time constant of the capacitor 114 and the resistor 116. When the capacitor 114 increases in charge, the grid of the tetrode 110 becomes increasingly less negative until the tetrode again is rendered conductive, at which time the triode 108 is again cut off. The output of the multivibrator tetrode 110, available at its anode terminal 118, comprises a positive pulse which is applied to the output lead 120 designated for connection to the "Q" gate circuit. During the time of the "Q" pulse shown in wave form (c) of Fig. 5, the anode of the triode 108 produces a negative pulse of the same duration, while the screen electrode of the tetrode 110 produces a positive pulse of the same duration. Also during conduction of the triode 108, the diode 112 will be rendered nonconductive by the positive voltage appearing at its cathode, whereby to produce at the terminal 122 a corresponding positive pulse across the resistor 124. This pulse developed at terminal 122 is applied through the resistor 126 to the luminance signal channel 50 with predetermined amplitude as established by the potential to which the resistor 124 is connected at terminal 128 and the values of resistors 124 and 126 which comprise the matrix circuit 41.

As has been stated supra, in connection with the block diagram of Fig. 4, the output pulse from the "Q" multivibrator 11 is employed in driving the horizontal delay multivibrator 29, which latter arrangement has as its purpose that of triggering the "I" multivibrator 13 at the proper time.

Figure 7:
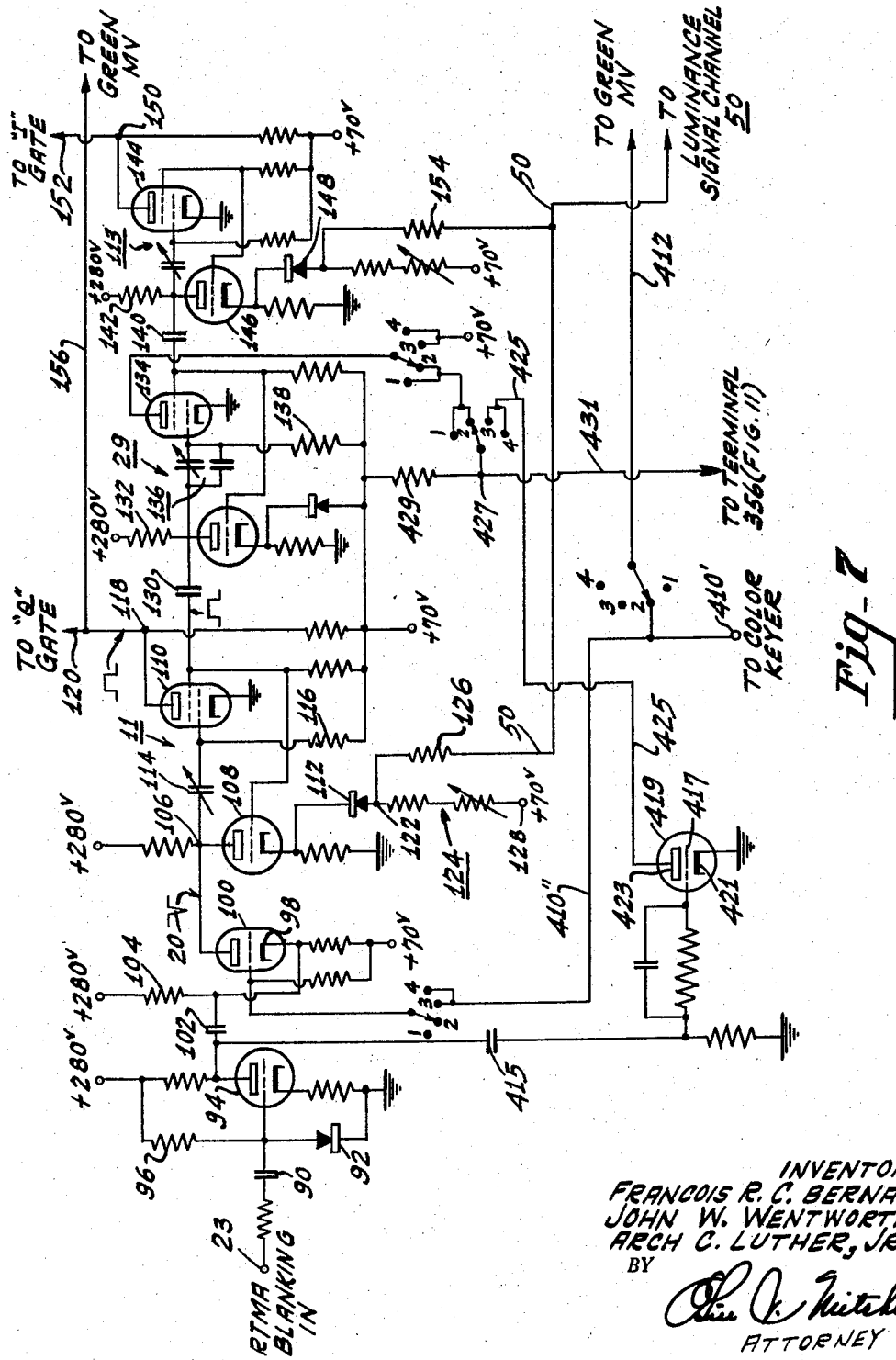

Thus, in Fig. 7 the positive pulse available at the screen electrode of the tetrode 110 of the "Q" multivibrator 11 is applied to the multivibrator 29 through a differentiating circuit comprising the capacitor 130 and the resistor 132, whereby to produce alternate positive and negative spikes corresponding to the leading and trailing edges of wave form (c) of Fig. 5. The negative spike is applied to the control electrode of the tetrode portion 134 of the multivibrator 29 through the capacitors 136. The multivibrator 29 may, as shown, be of the same type as that described in connection with the "Q" multivibrator 11, with the exception that a longer time constant is provided by the capacitors 136 and the resistor 138, the time delay being sufficient to produce a pulse at the screen electrode of the tetrode 134 such as that shown by wave form (d) of Fig. 5. The pulse thus produced is differentiated by the capacitor 140 and resistor 142 to produce alternate positive and negative spikes corresponding to its leading and trailing edges for application to the "I" multivibrator 13. The multivibrator 13 is shown as being substantially identical to the "Q" multivibrator 11 and comprises the normally conducting tetrode 144, normally non-conducting triode 146 and the diode 148. The negative pike produced from the trailing edge of the delay pulse from multivibrator 29 triggers the multivibrator 13 whereby to produce at the anode terminal 150 of the tetrode 144 a positive pulse occurring as shown in wave form (e) of Fig. 5. This positive pulse is available at the lead 152 which is designated for connection to the "I" gate. The corresponding positive pulse at the anode of the crystal diode 148 is applied through resistor 154 to the luminance channel 50. The positive pulse (wave form (c) of Fig. 5) at the output terminal 118 of the tetrode 110 (multivibrator 11) is also applied via the lead 156 to the input terminal 156' of the green multivibrator 14 in Fig. 8. The pulse at terminal 156' is, therefore, differentiated by the capacitor 158 and resistor 160 to produce alternate positive and negative spikes occurring in coincidence with the leading and trailing edges of the "Q" multivibrator pulse.

The multivibrator 14 is also of the type described for the preceding multivibrators and includes a normally conducting tetrode 162, a normally non-conducting triode 164 and a crystal diode 166. The negative spike produced by the differentiating circuit 158, 160 triggers the multivibrator 14, rendering the tetrode 162 nonconductive and the triode 164 conductive for a period determined by the time constant circuit comprising the capacitors 168 and resistor 170. With the proper values, the time constant circuit will cause the multivibrator 14 to produce the pulse shown in wave form (f) of Fig. 5, having a delay "w," at the output terminal 172 designated for connection via the lead 174 to the green gate. During the time of the green pulse shown in wave form (f) of Fig. 5, the anode of the triode 164 produces a negative pulse of duration "w," while the screen electrode of the tetrode 162 produces a positive pulse of the same duration. Also during conduction of the triode 164, the diode 166 will be rendered non-conducting, whereby to produce at the terminal 176 a corresponding positive pulse. This pulse developed at terminal 176 is applied through the resistor 178 to the luminance signal channel 50.

The negative pulse from the anode circuit of the multivibrator triode 164 is applied to the differentiating circuit comprising the capacitor 180 and resistor 182 which pro-
duces alternate negative and positive spikes corresponding to the leading and trailing edges of that pulse. The negative spike is passed by the crystal diode 184 as a trigger impulse for the red multivibrator 16 which may be substantially identical to the green multivibrator 14 with the exception of having different values for its time constant circuit 168', 170', whereby its output pulse at lead 186 is a positive pulse of duration $$\frac{w}{2}$$

(wave form (g) of Fig. 5). Simultaneously the positive pulse appearing at the screen electrode of the tetrode 162 of multivibrator 14 is differentiated by the capacitor 188 and resistor 190 to produce alternate positive and negative spikes corresponding to the leading and trailing edges of the green keying pulses shown in wave form (f) of Fig. 5. The negative spike is passed by the crystal diode 192 whereby to trigger the multivibrator 16 again so that its second output pulse of duration $$\frac{w}{2}$$

begins substantially coincidentally with the trailing edge of the green keying pulse. A positive pulse of duration $$\frac{w}{2}$$

is also available at the terminal 194 in circuit with the output diode 196 of the multivibrator 16 and its amplitude is determined by the setting of the variable resistor 198 in conjunction with the values of the resistors 200 and 202. The variable resistor 198 may be adjusted to cause the amplitude of the pulse to have its desired value. The negative and positive pulses produced by the triode and tetrode respectively of the multivibrator 16 are applied through the differentiating circuits indicated generally at 204 to the blue multivibrator 18, so that the blue multivibrator produces pulses beginning at the leading and trailing edges of the red multivibrator output pulses and of duration $$\frac{w}{4}$$

These blue output pulses are shown at the output lead 206 designated for connection to the blue gate circuit. In a manner similar to that described in conjunction with the output diodes 166 and 196 of the multivibrators 14 and 16, respectively, the circuit 18 produces a positive pulse of duration $$\frac{w}{4}$$

whose amplitude is determined by the setting of a variable resistor 208 in combination with the resistor 210. The pulse derived from the diodes in the cathode circuits of the three multivibrator triodes are all applied to the common channel 50 so that they are combined across a common load impedance comprising the parallel combination of resistors 208 and 210 and the corresponding resistors in multivibrators 11, 13, 14 and 16. By properly setting the values of these resistors in the cathode output circuits of the multivibrators, which circuits constitute the matrix circuits 41, 43, 44, 46 and 48 of Fig. 4, the luminance signal in channel 50 will have the proper relative amplitudes of 0.5 Q, 0.5 I, 0.59 G, 0.30 R and 0.11 B. Moreover, the addition of the several luminance pulses during those times when two of them occur at the same time, will produce the proper luminance values for the yellow, cyan and magenta signals shown in Fig. 5, namely, 0.59 Y, 0.70 C and 0.41 M.

Figure 8:
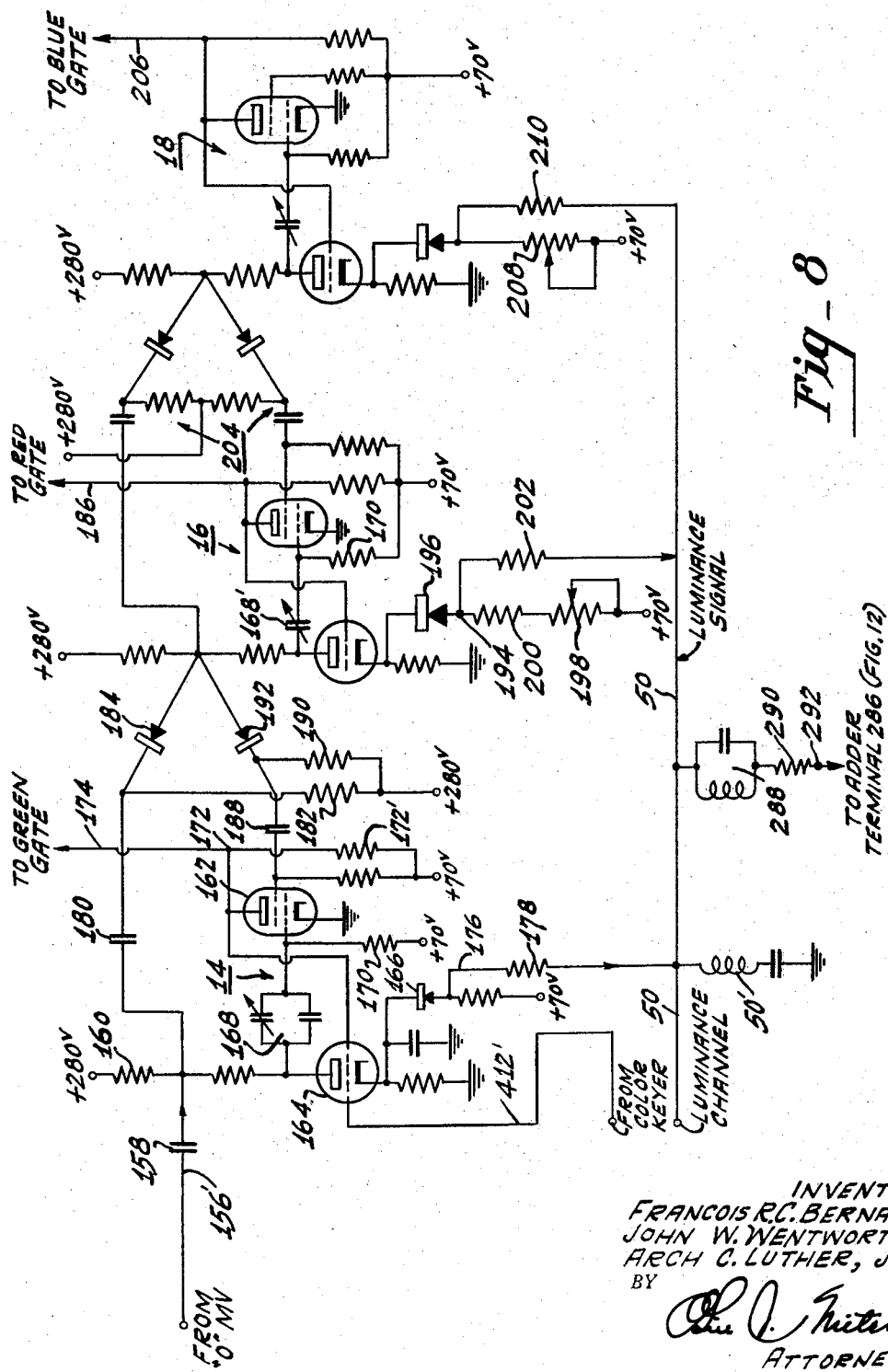

From the foregoing, it will be understood that the multivibrators 11, 13, 14, 16 and 18 of Figs. 7 and 8 produce the luminance signal in channel 50 and the gating pulses shown in wave forms (c), (3), (f), (g) and (h) of Fig. 5 for application, respectively, to the Q, I, green, red and blue gate circuits of the apparatus.

Figs. 9 and 10 illustrate, inter alia, the Q, I, green, red and blue gates as comprising the pentodes 21, 25, 24, 26 and 28, each of which includes in its cathode circuit, connected to a source of fixed potential, a variable resistor or gain control designated by the reference numerals 21′, 25′, 24′, 26′ and 28′. The suppressor grids of the pentodes 21, 25, 24, 26 and 28 are designated for connection to the output leads of the multivibrators 11, 13, 14, 16 and 18 (Figs. 7 and 8). That is to say, the suppressor grid of the pentode 21 is designated for connection to the output lead 120 of the "Q" multivibrator 11, while the corresponding electrodes of the pentodes 25, 24, 26 and 28 are adapted to be connected to the output leads 152, 174, 184 and 206 of the I, green, red and blue multivibrators, respectively. A source of subcarrier wave (not shown) supplies the 3.58 megacycle wave to terminal 32 for application to a conventional video frequency amplifier tube 33. The amplified subcarrier wave is then coupled via a capacitor 212 to the input of an accurately cut delay line comprising an uncalibrated section 214 and the sections 216, 218, 220, 222 and 224. The first tap on the delay line, namely, the tap 226 provides subcarrier frequency energy to the control grid of the green gate pentode 24. The second tap 228 provides subcarrier wave energy delayed 60.6° from the first tap to the control electrode of a burst gating pentode 33′ which comprises a circuit substantially identical to those described for the Q, I, green, red and blue burst gates 21, 25, 24, 26 and 28. A third tap 230 provides subcarrier energy delayed an additional 57° to the control electrode of the "I" gate pentode 25, while the fourth tap 232 connected to the end of a delay line portion which provides an additional 19.5° delay supplies subcarrier energy of that phase to the control electrode of the red gate pentode 26. Fifth and sixth taps 234 and 236 apply subcarrier waves of the phases shown to the "Q" and blue gating tubes 21 and 28.

Referring again to Fig. 1, it may be seen that the phases of the subcarrier wave applied to the several gates in Fig. 7 from the delay line sections correspond properly to the phases of the burst reference phase of the Q, I, red, blue and green vectors in Fig. 1. Thus, for example, the subcarrier phase applied to the pentode 33′ lags the green phase applied to the tube 24 by 60.6° (corresponding to the indication in Fig. 1 that green lags the burst by 299.4°). The sub-carrier phase applied to the red gating tube 26 lags the burst phase by 76.5°, as is required by the vector diagram of Fig. 1 and, thirdly, the subcarrier phase applied to the blue gate lags the burst phase by the sum of 76.5° and 115.9° or 192.4°. Finally, the "Q" and "I" gates receive waves which lag the burst reference by 57° and 147°, respectively.

As thus far described, the circuits of Figs. 7–10 provide continuous subcarrier wave energy to the control electrodes of the "Q," "I," green, red and blue burst gating pentodes and the multivibrators 11, 13, 14, 16 and 18 apply positive gating pulses to the "Q," "I," green, red and blue gates respectively, via the leads 120, 152, 174, 186 and 206. It is additionally required that the burst gating pentode 33′ of Fig. 10 be keyed into conduction in such manner as to afford a synchronizing burst of subcarrier wave and of the indicated phase at the time indicated by the reference numeral 12 in wave form (a) of Fig. 5. This keying of the burst gate is accomplished through the agency of part of the circuitry of Fig. 12, as follows: the television synchronizing pulses from a source not shown are applied to the terminal 52 of the synchronizing pulse amplifier 54 with negative polarity. Specifically, the pulses are applied to the control electrode of the triode 240 so that they appear in amplified form but with the opposite polarity at its anode output terminal 242. The amplified sync pulses are applied via a differentiating circuit including the variable capacitor 244 and a resistor 245 to the control electrode of one tube 246 of the burst flag generator 60, which tube comprises a triode having an anode load resistor 248. The positive pulses derived from the anode terminal 242 are differentiated by the capacitor 244 and resistor 245 to provide alternate positive and negative spikes as indicated at 250 which are, in turn, applied to the control electrode of the tube 246 which, as stated, forms a part of the burst flag generator 60. The triode 246 is biased so that the positive spikes applied to its control electrode overdrive the tube. The negative spikes, however, produce a positive impulse 252 at the terminal 254 in its anode circuit (i. e. across the load resistor 248). Terminal 254 is indicated for connection via the lead 256 to the burst gate 33′ of Fig. 10. Referring to Fig. 10, it will be seen that the lead 256 of Fig. 12 is designated for connection to the terminal 256′ which is connected to the input of a filter circuit 258 whose output terminal 260 is connected to the suppressor electrode of the synchronizing burst gate tube 33′. The timing of the pulse 252 applied to the burst gate 33′ will be understood from the fact that the negative spike of the pair 250 corresponds to the trailing edge of the horizontal sync pulses. By suitably varying the capacitor 244 in the control electrode circuit of the tube 246 of the burst flag generator, it is possible to adjust the width of the burst. The filter circuit 258 serves to delay (0.6 microsecond) the pulse which is applied to the burst gate 33′, so that its output burst 12 (wave form (a) of Fig. 5) occurs slightly after the sync pulse "S."

Since it is undesirable to produce color synchronizing bursts during the vertical synchronizing intervals of the television sequency, means are additionally provided for inactivating the burst flag generator during vertical synchronization. Such means will now be described. Vertical drive pulses which are ordinarily produced in the synchronizing generator such as would normally be employed for applying the pulses to the terminal 52, for example, are applied to the terminal 262 (Fig. 11) with negative polarity. The negative drive pulses are coupled via the capacitor 264 to the control electrode of a triode amplifier 266 which provides at its output terminal 268 a positive version of the drive pulses. Terminal 268 is capacitively coupled to the control electrode of a triode amplifier 270 (Fig. 12, "burst flag generator") whose anode 272 is connected to terminal 254 so that the tube 270 has in common with the tube 246 its load resistor 248. Tube 270, therefore, amplifies the positive-going drive pulses applied to its control electrode, so that there is produced at the terminal 254 a negative pulse 274 whose duration encompasses the synchronizing portion of the vertical synchronizing interval. The negative pulses 274 prevent the pulses 252 from the triode 246 from keying the synchronizing burst gate 33′ into conduction. In this manner, the synchronizing bursts are prevented from occurring during vertical synchronizing periods.

As described in connection with the block diagram of Fig. 4, the output signals of the gates 21, 25, 33′, 24, 26 and 28 are combined in a common lead 36 and applied to a band pass filter 38. Specific circuitry for performing this function is also shown in Fig. 10. The anodes of the pentodes 21, 25, 24, 26, 28 and 33′ are connected through respective load resistors to the common lead 36 which terminates at the input of a band pass filter 38 whose components are tuned to the 2–5 megacycle band. The output of the band pass filter 38 of Fig. 10 is available at the lead 38′ designated for connection to the adder 40. Circuitry suitable for performing the function of the adder 40 of Fig. 4 is shown in Fig. 12. The adder 40 in Fig. 12 comprises a tetrode 276 having a cathode 278, control electrode 280 and anode 282. The input terminal 38″ designated for connection to the lead 38′ at the output of the band pass filter 38 receives the combined subcarrier bursts from the filter and the bursts are applied via the capacitor 284 to the terminal 286.

At this point, it is to be noted that the luminance signal from the several matrix circuits connected to the multivibrators 11, 13, 14, 16 and 18 is available in channel 50 (Fig. 8). The series resonant circuit 50', tuned to subcarrier frequency, shunts any of that frequency to ground. The luminance signal is coupled via the tuned circuit 288, which presents a high impedance to subcarrier frequency, and resistor 290 to the terminal 292 which is designated for connection to the terminal 286 in Fig. 12.

Thus, at the terminal 286, the luminance signal from channel 50 and the composite subcarrier wave signal from the filter 38 are combined. The combined signal is then applied via the capacitor 294 to the control electrode 280 of the adder tube 276. The tube 276 is connected as a conventional amplifier having a gain control 296 in its cathode circuit and the tube provides at its output terminal 298 an amplified version of the combined luminance and chrominance signals. Terminal 298 is coupled via the capacitor 310 and resistor 302 to the control electrode 304 of a second tube 306 in the adder 40, which tube is connected at a cathode follower for isolating the adder stage 40 from the output amplifier stage 62. The output of the adder 40 is taken from the terminal 308 and applied via the capacitor 310 to the control electrodes of two amplifier tubes 312 and 314 which are connected in parallel for purposes of providing increased linearity over that which would be available through the use of a single tube. The amplifiers 312 and 314 have a common load impedance shown as the parallel combination of resistors 316 and 318, whereby there is available at the junction of their anodes (terminal 320) the further amplified luminance and chrominance signal.

Insofar as completion of the test signal shown by wave form (a) of Fig. 5 is concerned, the matter of adding synchronizing pulses "S" to the signal at terminal 320 is accomplished in a simple manner as follows: referring again to the sync amplifier 54 in Fig. 12, it is seen that the amplified sync pulses at terminal 242 are capacitively coupled to the control electrode 322 of an amplifier 324, whereby to provide at its anode 326 an amplified, negative version of the synchronizing pulses. These pulses are coupled via the capacitor 328 to an output lead 330 which is designated for connection to the terminal 330' of the output amplifier 62. The terminal 330' is, in turn, electrically connected to an output resistance 332 connected between the final output terminal 64 and ground reference potential. Since the composite luminance and chrominance signal from terminal 320 is capacitively coupled to appear across the resistor 332, the synchronizing pulses "S" from the amplifier 54 are caused to be additively combined with the composite signal in the resistor 332.

As thus far described, the apparatus of Figs. 7 through 12 has provided the composite test signal shown in wave form (a) of Fig. 5 and, in the absence of the remaining apparatus of those figures would continue to produce the wave form in question every television line, whereby to provide continuous vertical bars of the several colors described. In accordance with the present invention, however, the apparatus of Fig. 11 permits the introduction of television image information into the output signal for selected portions of a television field, whereby the color test signals appear in the borders of the raster of a receiver's image-reproducing device, as described in connection with Figs. 4 and 6.

In the schematic circuits of Figs. 7 through 12, the several four-position switch sections shown are so mechanically ganged to each other that they are all in the same position at any given time. Assuming, at the outset, that the switches are in position No. 2, it will be seen that the amplified and positive-going vertical driving pulses from terminal 268 (Fig. 11) are differentiated by a capacitor 340 and a resistor 342 whereby to provide alternate positive and negative spikes, the latter being adapted to trigger the "top color border keyer" multivibrator 71 which comprises a monostable multivibrator of the type, for example, as the multivibrators employed for keying the gating circuits. The multivibrator 71 produces, at its output terminal 344 a positive pulse (pulse 77 in Fig. 6(b)) whose duration determines the lower edge of the top color border, as described above. The specific duration of the pulse 77 is determined by the time constant of the circuit comprising the capacitor 346 and resistors 348 and 350. The output pulse from terminal 344 is, in turn, differentiated by the capacitor 352 and resistor 354, whereby its trailing edge triggers the "vertical 'white' keyer" multivibrator 73 which, in turn, produces at its output terminals 356 and 358 positive pulses such as those shown by wave form 79 in Fig. 6(b). The positive pulse 79 from terminal 356 is coupled via the capacitor 360 to the control electrode of a triode 362 comprising one portion of the "color keyer" 81. By virtue of the phase inverting action of an amplifier, there is produced at the output terminal 364 of the tube 362 a negative pulse of the same duration as the pulse 79 which is applied to the control electrode 366 of a cathode follower device 368 whose cathode is connected directly via a lead 370 to the anode terminal 372 of a tetrode 374. The tubes 368 and 374 comprise the video keyer indicated by the block 85 in Fig. 4. The anode terminal 372 of the tube 374 is connected to a source of positive potential through a resistor 376, while its cathode 378 is connected to ground through a conventional self-biasing arrangement comprising the parallel combination 380 of a resistor and capacitor.

Video signals 382 from any suitable source such as a television camera chain adapted to produce signals representative of a scene, for example, are applied to the video input terminal 83 which is connected via the D. C. restoration circuit including a diode 384 and discharge resistor 386 to the control electrode 388 of the tube 374. The anode terminal 372 of the last-mentioned tube is connected to the cathode 390 of a diode 392 whose anode 394 is connected to a source of positive operating potential at the terminal 396 through a resistor 398. The anode 394 of the diode 392 is designated for connection to the adder 40 of Fig. 12. Referring to Fig. 12, the anode 394 of the diode 392 is adapted for connection to the terminal 394' in Fig. 12 which, in turn, is connected to the control electrode 304 of the tube 306 through the resistor 302. Assuming, therefore, that the video signals 382 are of such polarity that "white" picture information extends in the positive direction, while the blanking portions 382' extend in the negative direction, the tube 374 will be rendered conductive by the video signals 382 and the diode 392 will pass the video signals as soon as its cathode 390 is caused to become less positive than its anode 394. Conduction of the diode 392, therefore, will apply the video signals to the control electrode 304 of the adder tube 306, whereby the tube 306 serves to pass the video signals through its output terminal 308 into the final or output amplifier 62 of Fig. 12. In the interest of completeness of description, it is to be noted that the cathode of the tube 368 in Fig. 11 has connected in circuit therewith a crystal diode 400 which has as its function that of preventing the cathode from rising too highly positive, for purposes which will appear more fully hereinafter.

As will be appreciated, it is necessary to inactivate, for that portion of the field in which video signals are being transmitted, the color bar producing circuits including the green, red and blue multivibrators. This inactivation is accomplished as follows: during the period of the pulse 79 from the multivibrator 72 in Fig. 11, the positive pulse at terminal 358 and corresponding to the pulse 79 is applied via a capacitor 402 to the control electrode 404 of a triode 406 which forms the second part of the color bar keyer 81 (i. e. in conjunction with the above-mentioned tube 362). The cathode of the tube 406 is connected to ground, while its anode 408 is connected to a lead 410 designated for connection to terminal 410' in Fig. 7. This connection, when traced through the switch (to the right of terminal 410') includes a lead 412 designated for connection to the green multivibrator in Fig. 8. Lead 412' in Fig. 8, adapted to be connected to lead 412 in Fig. 7, is connected directly to the control electrode of the triode 164 of multivibrator 14, through terminal 122 and resistor 172' to the source of positive potential indicated as +70 volts. Thus, the positive pulse at terminal 358 in the white vertical multivibrator 73 produces a corresponding negative pulse on the control electrode of the multivibrator triode 164 and prevents conduction of the latter for its duration. Since the triode 164 is thereby prevented from conducting, the triggers applied to the multivibrator 14 from terminal 156 (i. e. those derived from the "Q" multivibrator 11) are incapable of triggering the green multivibrator 14. Since the red and blue multivibrators 16 and 18 depend for their operation upon the action of the green multivibrator 14, it will be apparent that none of the multivibrators 14, 16 and 18 will be operative for the duration of the pulse 79 (Fig. 6(b)). In this fashion, the "Q" and "I" multivibrators 11 and 13 continue to operate as described supra, but, for the duration of the pulse 79 from multivibrator 73, the green, blue and red multivibrators are inoperative, during which time the video keyer 85 passes video signals from the terminal 83 to the adder 40. At the termination of the pulse 79 from the multivibrator 72, the following conditions will obtain: first of all, the green multivibrator 14 will again be released from the control of the color bar keyer switch tube 406, so that the green multivibrator will be free to operate under control of pulses from the "Q" multivibrator. Secondly, the video keyer 85 will be cut off in the following manner: as will be understood, the tetrode portion of the vertical white multivibrator 73 in Fig. 11 is normally conducting except for the time of the pulse 79 (Fig. 6(b)). Thus, the terminal 356, except for the duration of pulse 79, is normally negative, thereby (through the capacitive coupling of the capacitor 360) decreasing conduction of the tube 362, so that a positive potential is present at its anode terminal 364 and the control electrode 366 of the cathode follower 368. By reason of the cathode follower action, the lead 370 will also become more positive, thereby, through the connection at terminal 372, causing the cathode 390 of the diode 392 to become more positive than the anode 394, thus cutting off the conduction of the diode 392. Such cutting off of conduction in the diode prevents passage of video signals from the terminal 83 to the adder circuit 40.

As thus far described, therefore, it will be understood that the present invention provides novel means for producing the selective mixture of television image signals and color bar test signals such as is capable of producing, upon the screen of a receiver's kinescope, the test pattern of Fig. 6(b).

With the several sections of the switch in position No. 1, the test pattern of Fig. 6(a) is produced, which pattern comprises vertical bars of color extending throughout the height of the raster and with no television image in the center. In the first instance, it will be noted that the switch section connected between the cathode 378 of the video keyer tube 374 and ground will, in position No. 1, disconnect the cathode biasing circuit 380 from ground potential, thereby effectively disabling the tube 374, so that its anode terminal 372 will rise to the potential to which the resistor 376 is connected at its upper end. Since the cathode 390 of the diode 392 is also connected to terminal 372, the diode will be cut off, thereby preventing the passage of video signals from terminal 83 to the adder circuit 40. Also in this regard, it will be noted that, in position No. 1, of the switch, the resistor 348 in the top color bar multivibrator 71 will be disconnected from the positive potential terminal, thereby disabling that multivibrator. Since it is the multivibrator 71 which triggers the vertical white multivibrator 73 (as described above in connection with the description of switch position No. 2), the multivibrator 73 will receive no triggering impulses from the differentiating circuit 352, 354. Additionally, however, the resistor 356' in multivibrator 73 is open-circuited when the switch is in its free position No. 1, so that the multivibrator 73 does not produce the pulse 79 shown in Fig. 6(b). Since it is the multivibrator 73 which inactivates the green multivibrator 14 in position No. 2 of the switch it will be understood that the green multivibrator will now be permitted to continue operation throughout the television field, so that the green, red and blue multivibrators 14, 16 and 18, respectively, may continue to key their associated gate circuits. In this fashion, the circuitry of Figs. 7 through 12 produces at the output terminal 64 the test pattern wave form of Fig. 5(a) during every line of the television field, so that a receiver operating upon the signal will reproduce the pattern of Fig. 6(a). Otherwise, operation is substantially the same as that described for position No. 2 of the switch sections.

When the several switch sections are in position No. 3, however, the pattern of Fig. 6(c) is produced, that pattern being the same as the one shown in Fig. 6(b), except that the "Q" and "I" bars are limited to the top and bottom borders and do not extend vertically throughout the height of the raster as in Fig. 6(b). In position No. 3, therefore, it is necessary to prevent the triggering of the "Q" and "I" multivibrators 11 and 13, respectively, except during the top and bottom portions of the raster. In this position, the control electrode of the blanking amplifier tube 100 is connected through the switch terminal 3, the lead 410", the lead 410' to the lead 410 (Fig. 11) to the anode of the color keyer tube 406. Thus, during the operation of the vertical white multivibrator 73, the positive output pulse 79 from its terminal 358 is applied via the capacitor 402 to the control electrode 404 of the tube 406, causing that tube to conduct through the grid leak resistor of the tube 100, thereby cutting off conduction of the last-mentioned tube, so that that tube is ineffective, for the duration of the pulse 79, to pass the negative triggering pulses 20 to the "Q" multivibrator 11. Since the "Q" multivibrator triggers the "I" multivibrator through the intermediate agency of the white horizontal delay multivibrator 29, it will be understood that neither the "Q" nor the "I" multivibrators will operate to key its associated burst gating circuit for the duration of the pulse 79 from the multivibrator 73.

In position No. 3 of the switch sections, the video keyer tubes 368, 374, and 392 are operative to pass video signals from terminal 83 to the adder 40 during all of the television lines encompassed by the interval of the pulse 79. It is, however, necessary to prevent the passage of video signals during the horizontal blanking periods, as will be appreciated by those skilled in the art. Such preventive action is afforded as follows when the switches are in position No. 3: the positive blanking pulses available at the anode of the blanking amplifier 94 (Fig. 7) are coupled via a capacitor 415 to the control electrode 417 of a triode 419 whose cathode 421 is connected to ground, as shown, and whose anode 423 is connected via the lead 425 and switch terminal "3" to the lower end 427 of a resistor 429. The upper end of the resistor 429 is connected to a source of positive potential (indicated as +70 volts), thereby causing the resistor 429 to serve as a load resistor for the triode 419. The terminal 427 is connected by a lead 431 to terminal 356 in the anode circuit of the triode portion of the white vertical multivibrator 73 (Fig. 11). The positive-going horizontal blanking pulses which are applied to the control electrode of the triode 419 in Fig. 7 cause conduction of that tube, so that the terminal 427 is made to drop in potential to a less positive value (i. e. more negative). The resultant negative-going pulses are coupled from the terminal 356 through the capacitor 360 to the control electrode of the color bar keyer tube 362, decreasing conduction therein so that its anode terminal 364 becomes more positive. Since the control electrode 366 of the cathode follower 368 is directly connected to the terminal 364, the cathode of tube 368 will, through the connection via lead 370, raise the potential at terminal 372 in the anode circuit of the tubes 374, so that the cathode 390 of the diode 392 will become more positive than the anode 394. When such a condition exists, the diode 392 will be ineffective to pass video signals from the terminal 83 to the adder 40.

As has been mentioned briefly supra, the cathode of the tube 368 is connected to its source of operating potential at the terminal 368' through a crystal diode 400. The purpose of the diode 400 is that of preventing the cathode of the tube 368 from reaching too high a positive potential when the video keyer tubes are to be cut off. Otherwise, undesirable transients would occur in the video keyer circuits which would produce objectionable impulses in the output signal.

In the final position of the switch sections, namely, position No. 4, the operation of the circuits is substantially the same as that described in connection with position No. 3, the only difference being that the vertical dimensions of the top and bottom color borders are decreased; that is, the color borders (as shown in Fig. 6(d)) are substantially smaller in height than they are in Fig. 6(c). This shortening of the color borders is accomplished in the following manner: as has been explained, the height of the top color border is determined by the duration of the pulse 77 produced by the multivibrator 71. When the switch sections are in position No. 4, the time constant circuit of the multivibrator 71 includes the resistor 348 and a resistor 350' (rather than the resistor 350 of positions Nos. 2 and 3). The value of resistor 350' is chosen to be sufficiently smaller than that of the resistor 350, so that the duration of the pulse 77 produced at the terminal 344 of multivibrator 71 is also substantially decreased. The shorter pulse 77 is differentiated by the capacitor 352 and the resistor 354 and its trailing edge triggers the white vertical multivibrator 73, as explained. With the switch in position No. 4, however, the time constant circuit of the multivibrator 73 includes a resistor 433 which is larger in value than the corresponding resistor which is effectively in circuit for positions Nos. 2 and 3, thereby increasing the time constant of the multivibrator 73 so that its output pulse 79 is increased in duration. The duration of the pulse 79 for position No. 4 of the switch is chosen so that the trailing edge of the pulse occurs in time at a point corresponding to the desired top edge of the lower color border. Thus, the color border at the bottom of the raster in position No. 4 is decreased in height (as shown in Fig. 6(d)) just as was the top color border. Stated otherwise, in position No. 4 of the switch, the pulse 77 from multivibrator 71 is decreased in duration from its value for positions Nos. 2 and 3, while the pulse 79 is increased in duration from that which obtains in positions Nos. 2 and 3. The net effect of the increase in the duration of pulse 79 is that of shortening the color bars at the top and bottom of the raster. The passage of video signals from terminal 83 to the adder circuit is otherwise the same in position No. 4 as it is for position No. 3 of the switch sections and the "Q" and "I" multivibrators are also rendered inactive for the full duration of the pulse 79 from multivibrator 73.

From the foregoing, those skilled in the art will recognize that the present invention has provided circuitry involving a relatively small number of tubes, which circuitry is capable of producing a selective mixture, in time, of color test bar patterns of the type shown in Fig. 5(a) with video signals representative of any desired television image, monochrome or color television, and in such manner that any one of several different patterns may be reproduced on the screen of a monitor or receiver operating upon the composite signal produced by the apparatus of the present invention.

Having thus described our invention, what we claim as new and desire to secure by Letters Patent is:

1. Signal generating apparatus for use in conjunction with a color television system having predetermined line and field rates and in which various colors are represented by specific phases of a color subcarrier wave, said apparatus comprising: a first means including a first pulse generator operative at line rate for producing a burst of subcarrier wave energy of a specific phase; a second pulse generator coupled thereto and adapted to produce a pulse of predetermined duration less than a television line and beginning at the end of a pulse produced by said first pulse generator; color bar generating means responsive to pulses from said first pulse generator for producing within a television line interval a plurality of color-representative bursts of subcarrier wave energy of specific phases different from each other; a third pulse generating means operable at television field frequency for inactivating said color bar generating means for a selected portion of each television field; video keyer means adapted to receive television image signals and including an amplifier tube having an output terminal; means for applying pulses from said third pulse generating means to said video keyer means in such manner as to prevent said video keyer means from passing such image signals to said output terminal during that portion of each television field in which said third pulse generating means is inoperative to inactivate said bar generating means; and switch means for selectively inactivating said third pulse generating means, thereby to prevent inactivation of said color bar generating means by said third pulse generating means, said switch means including an element for rendering said amplifier tube non-conductive so that said video keyer means is inoperative to pass video signals to said output terminal during any part of a field interval.

2. Signal generating apparatus for use in conjunction with a color television system having predetermined line and field rates and in which various colors are represented by specific phases of a color subcarrier wave, said apparatus comprising: a first means including a first pulse generator operative at line rate for producing a burst of subcarrier wave energy of a specific phase; a second pulse generator coupled thereto and adapted to produce a pulse of predetermined duration less than a television line and beginning at the end of a pulse produced by said first pulse generator; color bar generating means responsive to pulses from said first pulse generator for producing within a television line interval a plurality of color-representative bursts of subcarrier wave energy of specific phases different from each other; a third pulse generating means operable at television field frequency for inactivating said color bar generating means for a selected portion of each television field; video keyer means adapted to receive television image signals and having an output terminal; means for applying pulses from said second pulse generator to said video keyer means to prevent it from passing image signals to said output terminal during that part of each television line in which bursts are produced by said bar generating means; means for applying pulses from said third pulse generating means to said video keyer means to prevent said video keyer means from passing image signals to said output terminal during that portion of each television field in which said third pulse generating means is inoperative to inactivate said bar generating means, said first pulse generator comprising a multivibrator, and switch means for selectively inactivating said multivibrator during each television line interval encompassed by the pulse from said third pulse generator.

3. The invention as defined by claim 1 which includes an additional burst-producing means for producing a burst of subcarrier wave energy of phase different from the phases of the bursts produced by said first means and said bar-generating means, said additional burst-producing means being coupled to and responsive to pulses from said second pulse generator, such that it produces its burst at the end of a pulse from said second pulse generator.

4. In a signal generator for use in conjunction with a color television system having predetermined line and field rates and in which various colors are represented by specific phases of a color subcarrier wave, apparatus comprising: a first gate; a second gate; means for applying different phases of a subcarrier wave to said first and second gates; a first pulse generating means operable at television line rate for producing a pulse occurring at substantially the beginning of the television line; means for applying gating pulses from said first pulse generating means to said first gate in such manner as to cause said gate to produce a burst of subcarrier wave of a certain phase; a second pulse generator coupled to said first pulse generating means and responsive to pulses therefrom for providing a line-rate delay pulse whose duration is equal to a predetermined portion of a television line interval; a third pulse generating means coupled to said second pulse generator and to said second gate in such manner as to cause said second gate to produce a burst of subcarrier wave of a predetermined phase at the end of the pulse from said second pulse generator, the duration of said pulses from said second pulse generator being such as to delay the operation of said second gate until a time just before the end of the television line in which said first gate is actuated.

5. In a signal generator for use in conjunction with a color television system having predetermined line and field rates and in which various colors are represented by specific phases of a color subcarrier wave, apparatus comprising: a first gate; a second gate; means for applying different phases of a subcarrier wave to said first and second gates; a first pulse generating means operable at television line rate for producing a pulse occurring at substantially the beginning of the television line; means for applying gating pulses from said first pulse generating means to said first gate in such manner as to cause said gate to produce a burst of subcarrier wave of a certain phase; a second pulse generator coupled to said first pulse generating means and responsive to pulses therefrom for providing a line-rate delay pulse whose duration is equal to a predetermined portion of a television line interval; a third pulse generating means coupled to said second pulse generator and to said second gate in such manner as to cause said second gate to produce a burst of subcarrier wave of a predetermined phase at the end of the pulse from said second pulse generator, the duration of said pulses from said second pulse generator being such as to delay the operation of said second gate until a time just before the end of the television line in which said first gate is actuated; color bar generating means adapted to produce a plurality of bursts of different color-representative phases of subcarrier wave within the period of said pulse from said second pulse generator; and means including a coupling circuit operatively connected between said second pulse generating means and said bar generating means for applying pulses from said first pulse generating means to said bar generating means for causing said bar generating means to produce such plurality of bursts before such burst is produced by said second gate.

6. The invention as defined by claim 2, including a top color border pulse generating multivibrator circuit operative to produce a pulse at the commencement of each television field, said third pulse generating means being responsive to the trailing edge of a pulse from said top color border pulse generating circuit, and switch means for selectively decreasing the duration of the pulse produced by said top color border pulse generating multivibrator circuit, thereby to initiate the operation of said third pulse generating means a shorter time after the commencement of a television field.

References Cited in the file of this patent
UNITED STATES PATENTS

| | | |
|---|---|---|
| 2,164,297 | Bedford | June 27, 1939 |
| 2,683,187 | Rynn | July 6, 1954 |
| 2,734,939 | Houghton | Feb. 14, 1956 |
| 2,742,525 | Larky | Apr. 17, 1956 |